US008250128B2

(12) United States Patent
Vasyltsov et al.

(10) Patent No.: US 8,250,128 B2
(45) Date of Patent: Aug. 21, 2012

(54) APPARATUS AND METHODS FOR AUTONOMOUS TESTING OF RANDOM NUMBER GENERATORS

(75) Inventors: Ihor Vasyltsov, Gyeonggi-do (KR); Young-sik Kim, Gyeonggi-do (KR); Hambardzumyan Eduard, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1330 days.

(21) Appl. No.: 11/978,464

(22) Filed: Oct. 29, 2007

(65) Prior Publication Data

US 2009/0037787 A1 Feb. 5, 2009

(30) Foreign Application Priority Data

Jul. 30, 2007 (KR) ........................ 10-2007-0076433

(51) Int. Cl.
*G06F 1/02* (2006.01)

(52) U.S. Cl. ........................................................ 708/250

(58) Field of Classification Search ........... 708/250–256
See application file for complete search history.

(56) References Cited

U.S. PATENT DOCUMENTS

| | | | | |
|---|---|---|---|---|
| 6,675,113 | B2 | 1/2004 | Hars | 702/75 |
| 2003/0021411 | A1* | 1/2003 | Seroussi et al. | 380/46 |
| 2003/0158875 | A1* | 8/2003 | Hars | 708/250 |
| 2003/0158876 | A1* | 8/2003 | Hars | 708/250 |
| 2003/0187598 | A1 | 10/2003 | Hars | |
| 2003/0200238 | A1* | 10/2003 | Hars | 708/250 |
| 2003/0200239 | A1* | 10/2003 | Hars | 708/250 |
| 2004/0098429 | A1 | 5/2004 | Crispin et al. | 708/250 |
| 2008/0025506 | A1* | 1/2008 | Muraoka | 380/46 |

FOREIGN PATENT DOCUMENTS

| | | |
|---|---|---|
| JP | 2006318092 | 11/2006 |
| KR | 1020060070687 | 6/2006 |

OTHER PUBLICATIONS

Korean First Office Action (5 pages) corresponding to Korean Patent Application No. 10-2007-0076433; Dated: Nov. 21, 2008.

* cited by examiner

*Primary Examiner* — Tan V. Mai
(74) *Attorney, Agent, or Firm* — Myers Bigel Sibley & Sajovec

(57) ABSTRACT

Apparatus for testing a random number generator includes a random number generating unit that generates and outputs random numbers, and a switching unit that receives the random numbers from the random number generating unit and selectively transmits the random numbers in response to a switching control signal. A test unit performs a basic test on the random numbers to determine whether the transmitted random numbers are within a statistical range, controls the generation of random numbers according to a result of the basic test, and outputs the switching control signal based on whether a test suite is finished. Methods include performing a basic test on generated random numbers to determine whether the random numbers are within a statistical range, controlling the generation of random numbers in response to a result of the basic test and whether the basic test is finished, determining upon completion of the basic test if a test suite is finished, and if the test suite is finished, outputting the random numbers as final random numbers.

19 Claims, 4 Drawing Sheets

APPARATUS AND METHODS FOR AUTONOMOUS TESTING OF RANDOM NUMBER GENERATORS

CROSS-REFERENCE TO RELATED PATENT APPLICATION

This application claims the benefit under 35 USC §119 of Korean Patent Application No. 10-2007-0076433, filed on Jul. 30, 2007, in the Korean Intellectual Property Office, the disclosure of which is incorporated herein in its entirety by reference.

BACKGROUND

The present invention relates to random number generators, and in particular to apparatus and methods for testing a random number generator.

As information and communication based technologies have developed, encryption and decryption have become important means of protecting the confidentiality of information. Random numbers are used in many applications such as the generation of secret keys for security systems. Accordingly, systems in which security is important use a random number generator. Random number generators are designed to generate unpredictable random numbers.

In general, random numbers are categorized into pseudo-random numbers which can be generated using mathematical formulae and software, and true random numbers (TRNs) which can be generated using physical noise sources.

Since pseudo-random numbers are generated based on mathematical formulae, the pseudo-random numbers contain some inherent predictability, and have periodicity and consistency according to the generation method utilized. Ideally, random numbers should be unpredictable and should have no periodicity. Accordingly, pseudo-random numbers are not ideal random numbers. Hence, systems in which the confidentiality of private information is fundamentally important should not use pseudo-random numbers because the quality of random numbers generated by a random number generator directly affects the security of the systems.

Accordingly, for systems requiring high quality security, it is generally desirable to generate TRNs.

Also, since the publishing of a random number security standard AIS. 31 specifying the required functions of TRNs and methods of statistically testing random numbers, generated random numbers shall have to meet requirements specified in the standard AIS. 31. According to the standard AIS. 31, the statistical characteristics of random numbers generated by a TRN generator applied to a security system are required to be tested even during operation.

SUMMARY

Embodiments of the present invention provide apparatus for an online test of a random number generator, which can help to ensure the quality of random numbers without providing statistically weak data.

Embodiments of the present invention can also provide methods for online testing of a random number generator, which can help to ensure the quality of random numbers without providing statistically weak data.

An apparatus for testing a random number generator according to some embodiments of the invention includes a random number generating unit configured to generate and output random numbers, and a switching unit configured to receive the random numbers from the random number generating unit and to selectively transmit the random numbers to a final output unit or a test unit in response to a switching control signal. The test unit may be configured to perform a test on the random numbers to determine whether the transmitted random numbers are within a statistical range, configured to control the generation of random numbers according to a result of the test, and configured to output the switching control signal based on whether a test suite is finished.

The test unit may be configured to extract statistical data from the random numbers. The statistical data may include information on whether the transmitted random numbers are within the statistical range.

If the result of the test shows that the transmitted random numbers are outside the statistical range, the test unit may be configured to determine that a preliminary error has occurred.

If the preliminary error occurs more than a predetermined number of times, the test unit may be configured to determine that an error has occurred in the random number generating unit. If it is determined that an error has occurred in the random number generating unit, the test unit may be configured to output a random number generation stop signal to the random number generating unit to stop the generation of random numbers.

If it is determined that a preliminary error has occurred, the test unit may be configured to output a refresh signal to the random number generating unit to reset the random number generating unit. If the preliminary error has occurred fewer than a predetermined number of times, the test unit may be configured to reset the test and to perform the test again.

If it is determined that the random numbers are normal but the test is not finished, the test unit may be configured to output a further signal to the random number generating unit commanding the random number generating unit to generate more random numbers. If it is determined that the random numbers are normal and the test is finished, the test unit may be configured to determine whether the test suite has been performed a predetermined number of times.

If it is determined that the test suite has been performed the predetermined number of times, the test unit may be configured to generate a switching control signal to connect the random number generating unit to the final output unit, and if it is determined that the test suite has not been performed the predetermined number of times, the test unit may be configured to generate a switching control signal to connect the random number generating unit to the test unit.

The test unit may be configured to receive information on a system clock and information on a number of tests performed for a predetermined period of time, and to determine using the received information whether the test has been performed the predetermined number of times.

The switching unit may include a de-multiplexer that may be configured to respond to the switching control signal, and that has an input end connected to an output end of the random number generating unit, a first output end connected to the final output unit, and a second output end connected to an input end of the test unit.

Methods for testing a random number generator according to some embodiments of the invention include performing a test on generated random numbers to determine whether the random numbers are within a statistical range, controlling the generation of random numbers in response to a result of the test and whether the test is finished, determining upon completion of the test if a test suite is finished, and if the test suite is finished, outputting the random numbers as final random numbers.

Performing the test may include extracting statistical data from the generated random numbers, and determining based on the statistical data whether the random numbers are within the statistical range.

Controlling the generation of the random numbers may include, if the result of the test shows that the generated random numbers are outside the statistical range, determining that a preliminary error has occurred, and resetting the generated random numbers.

Controlling the generation of the random numbers may include determining if the preliminary error has occurred more than a predetermined number of times, and if it is determined that the preliminary error has occurred more than the predetermined number of times, determining that an error has occurred in the generation of the random numbers.

Controlling the generation of the random numbers may include, if it is determined that an error has occurred in the generation of the random numbers, stopping the generation of random numbers.

Controlling the generation of the random numbers may include, if the preliminary error has occurred less than the predetermined number of times, generating additional random numbers and performing the test on the additional random numbers.

Determining whether the test suite is finished may include, if it is determined that the random numbers are normal but the test suite is not finished, generating more random numbers.

Determining whether the test suite is finished may include, if it is determined that the random numbers are normal and the test is finished, determining whether the test suite has been performed a predetermined number of times. If it is determined that the test suite has been performed the predetermined number of times, the test suite may be finished, and if it is determined that the test suite has not been performed the predetermined number of times, the test may be performed again.

Determining whether the test is finished may include receiving information on a system clock and the number of the tests performed for a predetermined period of time, and determining based on the received information whether the test suite has been performed the predetermined number of times.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS OF THE INVENTION

Figure 1:
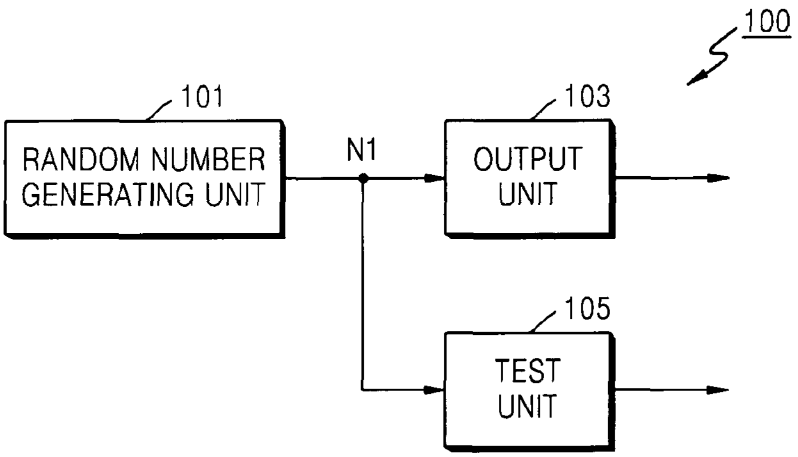
FIG. 1 is a block diagram of a conventional random number generator.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

As noted above, it may be desirable for systems in which security is fundamentally important to generate true random numbers (TRNs), such as for use in encryption/decryption. In this case, the quality of the randomness of the true random numbers is directly related to the level of security of the system.

TRN generators that generate random numbers using external noise sources are often affected by age degradation, and environmental fluctuations such as temperature.

Such external factors may decrease the quality of generated random numbers and/or may cause statistically weak data to be output.

"Statistically weak data" refers to random numbers having statistical characteristics which fail to meet requirements specified in a standard such as NIST SP800-22 or FIPS 140-1/2. For reference, the standards NIST SP800-22 and/or FIPS 140-1/2 define a range in which random numbers are acceptable as TRNs. Whether random numbers are within our outside the range defined by the standard is determined based on the statistical characteristics of the random numbers. The standards NIST SP800-22 and/or FIPS 140-1/2 specify statistical characteristics that are required of random numbers, which is well known to one of ordinary skill in the art.

In order to be accepted as acceptable TRNs, generated random numbers are required to have balance and low correlation, that is, shall be within the tolerable range defined based on the statistical characteristics by the standards NIST SP800-22 and/or FIPS 140-1/2.

The quality of random numbers is directly related to the security of a system. If random numbers do not have required statistical characteristics but have periodicity or consistency, the random numbers become more predictable. If predictable random numbers are used as a secret key for the system, the security of the system may be compromised.

Accordingly, statistically weak data having unsatisfactory statistical characteristics should not be output as random numbers.

According to a standard AIS. 31, random numbers that are finally output from among a plurality of random numbers generated by a random number generator shall have statistical characteristics which meet requirements specified in the standard AIS. 31.

Since apparatus and/or methods for an online test of a random number generator according to embodiments of the present invention can test the statistical characteristics of random numbers and automatically control a switching unit using the test results, statistically weak data can be prevented from being generated and/or used. That is, apparatus and/or methods according to embodiments of the present invention can assist in satisfying the requirements of standards such as AIS. 31 and can help to ensure the quality of random numbers output by a random number generator.

The present invention will now be described more fully with reference to the accompanying drawings, in which the exemplary embodiments of the invention are shown. In the drawings, the same reference numerals denote the same elements.

FIG. 1 is a block diagram of a conventional random number generator 100.

Referring to FIG. 1, the conventional random number generator 100, which can perform a test on random numbers, includes a random number generating unit 101, an output unit 103, and a test unit 105.

The random number generating unit 101 can generate TRNs from physical noise sources. Random numbers output from the random number generating unit 101 are transmitted to a first node N1, and then transmitted from the first node N1 to the output unit 103 and the test unit 105 in a parallel manner.

The output unit 103 directly outputs random numbers input thereto from the random number generating unit 101. That is, whether or not the random numbers have balance and low correlation, the output unit 103 outputs the random numbers generated and transmitted by the random number generating unit 101.

The test unit 105 evaluates the quality of random numbers output from the random number generating unit 101. The quality of the output random numbers may be evaluated in various ways and standards.

The conventional random number generator 100 of FIG. 1 simultaneously outputs random numbers and performs a test. Accordingly, since the random numbers output through the output unit 103 are not evaluated on whether they satisfy security requirements, such as balance and low correlation, erroneous random numbers having unbalance and/or high correction, which are outside a tolerable range defined by a standard, may be output by the output unit 103.

Although the result of the test is fed back and reflected on the generation of random numbers, the erroneous random numbers have already been output through the output unit 103. Once the erroneous random numbers are output, they may be used as a secret key for a security system, such as an encryption device, thereby potentially compromising the security system.

Figure 2:
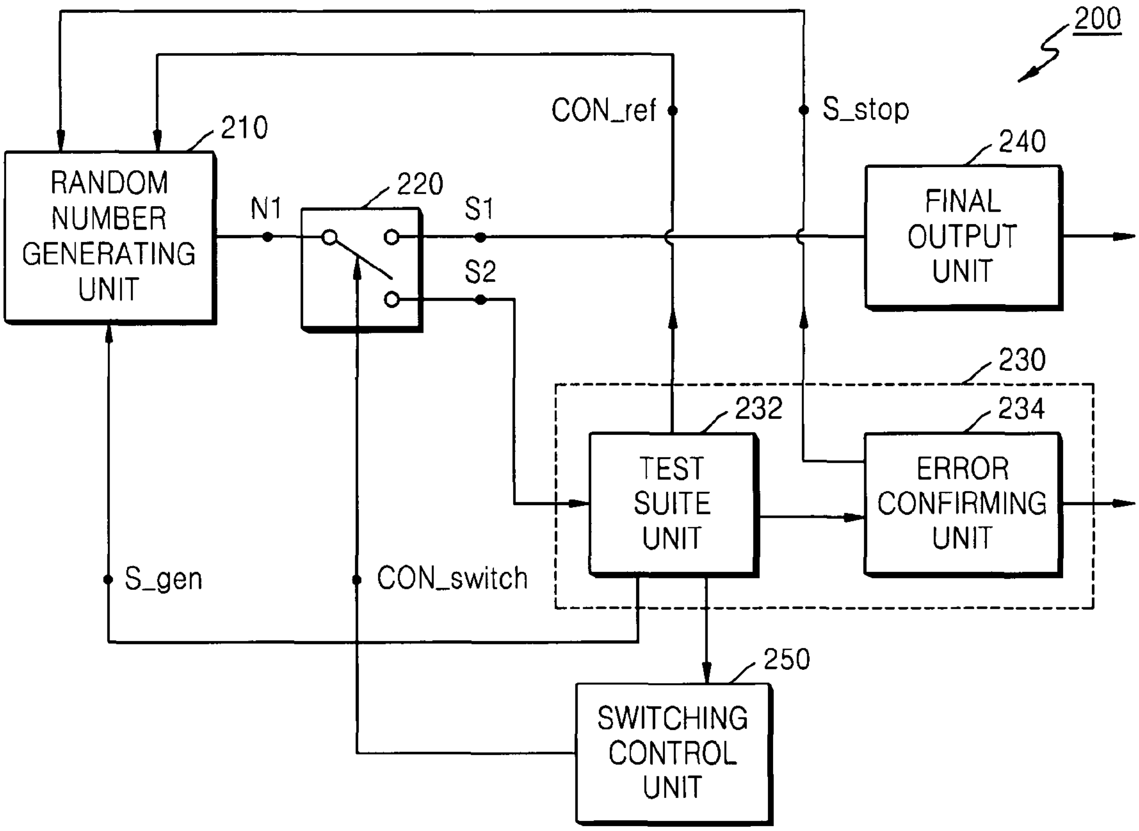
FIG. 2 is a block diagram of an apparatus for an online test of a random number generator according to some embodiments of the present invention.

FIG. 2 is a block diagram of an apparatus 200 for an online test of a random number generator according to some embodiments of the present invention.

Figure 3:
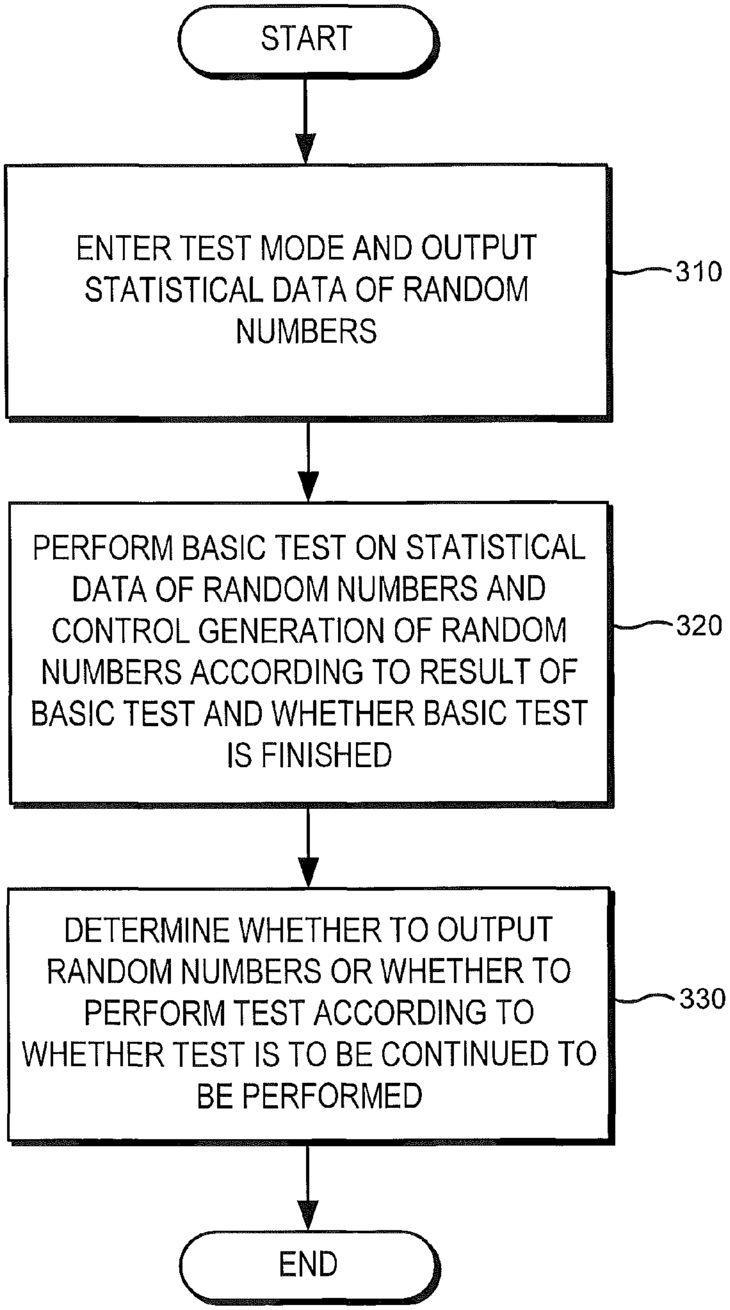
FIG. 3 is a flowchart illustrating operations of a test unit and a switching unit of the apparatus of FIG. 2.

FIG. 3 is a flow chart illustrating operations of a test unit 230 and a switching unit 220 of the apparatus 200 of FIG. 2.

The construction and operation of the apparatus 200 will now be explained with reference to FIGS. 2 and 3.

Referring to FIG. 2, the apparatus 200 includes a random number generating unit 210, the switching unit 220, the test unit 230, and a switching control unit 250. The apparatus 200 may further include a final output unit 240.

The random number generating unit 210 generates and outputs TRNs to a first node N1. The random number generating unit 210 receives and responds to a refresh signal CON_ref, a random number generation stop signal S_stop, and a further generate signal S_gen output from the test unit 230 and the switching control unit 250. The random number generating unit 210 may include therein a separate memory, e.g., a register (not shown), in which the generated random numbers can be stored.

The switching unit 220 connects the first node N1 to a terminal S1 connected to the final output unit 240 or a terminal S2 connected to the test unit 230, in response to a switching control signal CON_switch output by the switching control unit 250.

The test unit 230 provides random numbers transmitted through the terminal S2 to a test suite unit 232 (operation 310), and the test suite unit 232 performs a test on the random numbers. A test can be performed by extracting only statistical data from the random numbers, and the random numbers may not be stored specially.

The test suite unit 232 performing the test determines whether the extracted statistical data are within a statistical range defined by a standard and controls the generation of random numbers by the random number generating unit 210 based on the determination result (operation 320). If it is determined by the test suite unit 232 that a generated random number is outside the statistical range, a refresh signal CON_ref is output. If a generated random number is outside the statistical range, it is an indication that a preliminary error has occurred.

In response to the refresh signal CON_ref, the random number generating unit 210 refreshes random numbers stored in the separate memory therein, so that all the random numbers stored in the separate memory may be reset and new random numbers may be stored.

If a preliminary error occurs, an error confirming unit 234 stores information relating to the preliminary error. If the preliminary error occurs more than a predetermined number of times, the error confirming unit 234 determines that an error has occurred in the random number generating unit 210. The error confirming unit 234 included in the test unit 230 receives information relating to the preliminary error and accordingly determines whether an error has occurred.

The error confirming unit 234 may be included in the test suite unit 232. That is, the test suite unit 232 may also function as the error confirming unit 234.

If the error confirming unit 234 confirms that an error has occurred, the error confirming unit 234 outputs a random number generation stop signal S_stop so that the random number generating unit 210 no longer generates random numbers. That is, the generation of random numbers is controlled by the result of the test (operation 320).

After the test performed by the test unit 230 is successfully finished, the switching unit 250 determines whether the test is continued, and accordingly outputs a switching control signal CON_switch so that the random numbers generated by the random number generating unit 210 are to be output to the final output unit or to the test unit 230 (operation 330).

The operation of the apparatus 200 will now be explained in detail with reference to FIG. 4A.

Figure 4A:
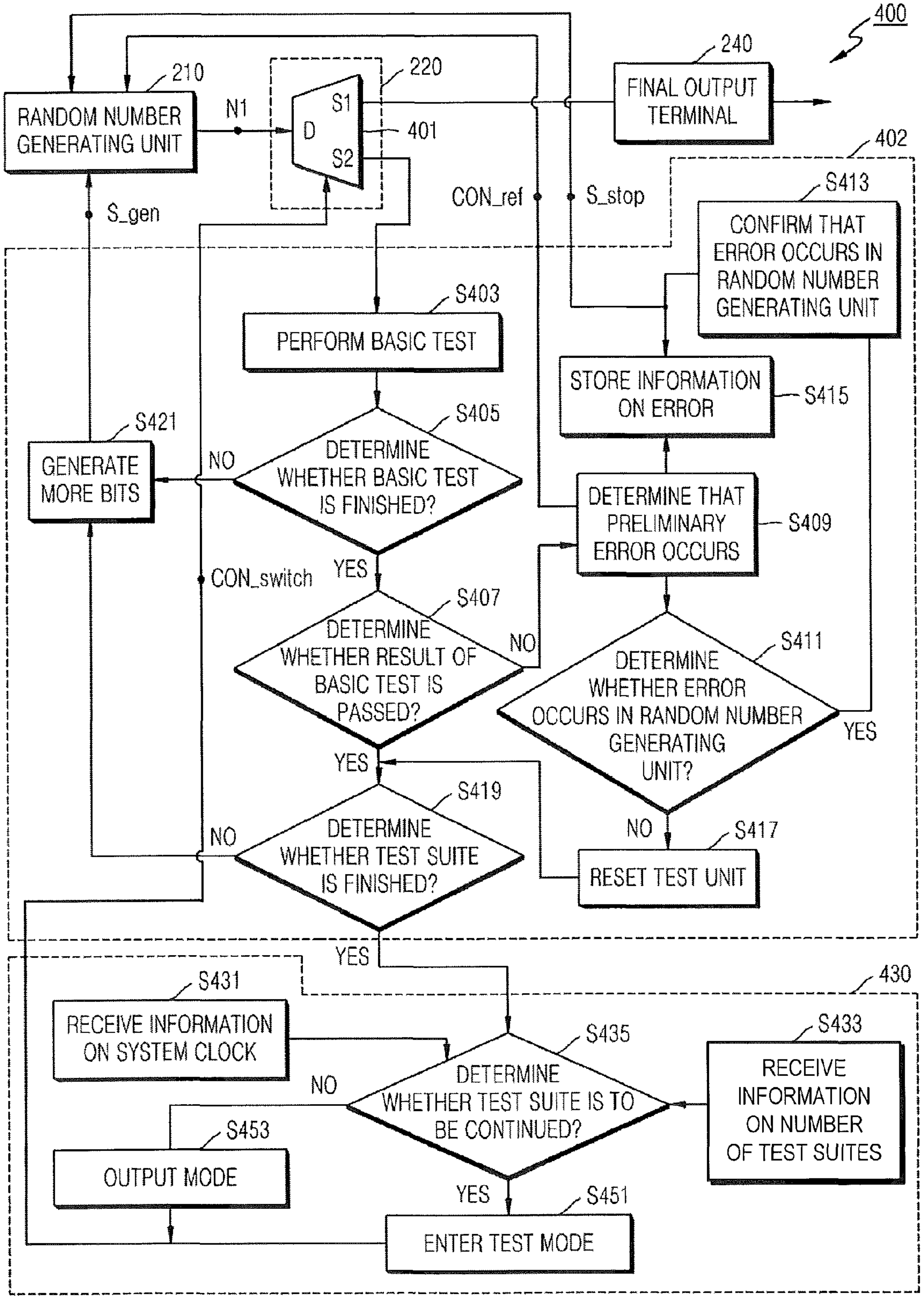
FIG. 4A is a detailed diagram illustrating operations of the test unit and the switching unit of the apparatus of FIG. 2.

FIG. 4A is a detailed diagram illustrating operations of the test unit 230 and the switching unit 220 of the apparatus 200 of FIG. 2.

Referring to FIG. 4A, the random number generating unit 210 can continuously generate TRNs as a sequence of data of a predetermined size.

The switching unit 220 may be a switching component such as a de-multiplexer, a transfer gate, a transistor, or the like. The switching component is well known to one of ordinary skill in the art. In FIG. 4, the switching unit 220 includes a de-multiplexer 401, for example.

A flowchart in a block 402 illustrates operations of the test unit 230 of the apparatus 200 of FIG. 2. A flowchart in a block 430 illustrates operations of the switching control unit 250 of the apparatus 200 of FIG. 2.

In operation S403, an apparatus 400 for an online test of a random number generator enters a test mode and connects the first node N1 to the terminal S2 to perform a test. The test unit 230 extracts statistical data from the random numbers generated by the random number generating unit 210.

The statistical data can contain information on whether the statistical characteristics of random numbers satisfy requirements specified in a standard, such as NIST SP800-2 and/or FIPS 140-1/2. As described above, in order to be used as a secret key for a security system, random numbers should have balance and low correlation. The standards NIST SP800-2 and/or FIPS 140-1/2 define a tolerable range of inconsistency or non-periodicity in which random numbers can be used for a security system. Accordingly, the statistical data can contain information on whether the random numbers generated by the random number generating unit 210 are within the tolerable range.

As can be seen from block 402, the test unit 230 does not directly store the random numbers generated and transmitted by the random number generating unit 210, but extracts and uses the statistical data obtained from the random numbers. Accordingly, a separate memory, e.g., a register, is not required to store the transmitted random numbers, thereby potentially simplifying the apparatus 400 and/or reducing the cost of the test unit 230.

In operation S405, the test unit 230 determines whether a test is finished. The test is performed on a predetermined number (e.g., first number) of random numbers. Accordingly, once the first number of random numbers have been tested, the test is finished. That is, the test is not finished until the first number of random numbers have been transferred. Accordingly, in operation S421, the test unit 230 may send a further generate signal S_gen to the random number generating unit 210 so that more bits are generated if the test is not finished.

If it is determined in operation S405 that the test is finished, the process goes to operation S407. In operation S407, the test unit 230 determines whether or not the test has been passed. If the statistical data of the transmitted random numbers satisfy requirements defined by the standard, it is determined that the test has been passed. If the statistical data of the transmitted random numbers do not satisfy one or more of the requirements, it is determined that the test has been failed.

If it is determined in operation S407 that the test has been failed, the process goes to operation S409. In operation S409, it is determined that a preliminary error has occurred. That is, if there are some statistical data which do not satisfy one or more of the requirements, it is determined that an error has occurred in one or more of the random numbers generated by the random number generating unit 210.

In operation S415, information on the preliminary error is stored in the error confirming unit 234 (see FIG. 2).

Furthermore, in operation S411, it is determined whether an error has occurred in the random number generating unit 210. The determination in operation S411 is performed by determining whether a preliminary error has occurred more than a predetermined number of times. The predetermined number of times can vary according to the degree of security required/desired by a security system. A security system desiring/requiring high quality security may set the predetermined number of times to a very low value. For example, such a predetermined number of times may be set to about 3.

That is, when the test is performed continuously and it is determined that a preliminary error has occurred more than the predetermined number of times, in operation S413, the error confirming unit 234 confirms that an error has occurred in the random number generating unit 210, and accordingly outputs a random number generation stop signal S_stop to the random number generating unit 210. The random number generating unit 210 stops generating random numbers in response to the random number generation stop signal S_stop.

If it is not determined in operation S411 that an error has occurred in the random number generating unit 210, the process goes to operation S417. In operation S417, the test unit 230 is reset, so that all the statistical data stored in the test unit

230 are reset, new random numbers are received from the random number generating unit 210, and new statistical data are produced. That is, when a preliminary error occurs but it has not been confirmed that an error has occurred in the random number generating unit 210, all the statistical data stored in the test unit 230 may be reset and a test can be performed again.

If it is determined in operation S407 that the test has been passed, the process goes to operation S419. In operation S419, it is determined whether or not the test suite is finished. A difference between the finishing of the test suite in operation S419 and the finishing of the test in operation S405 will now be explained with reference to FIG. 4B.

Figure 4B:
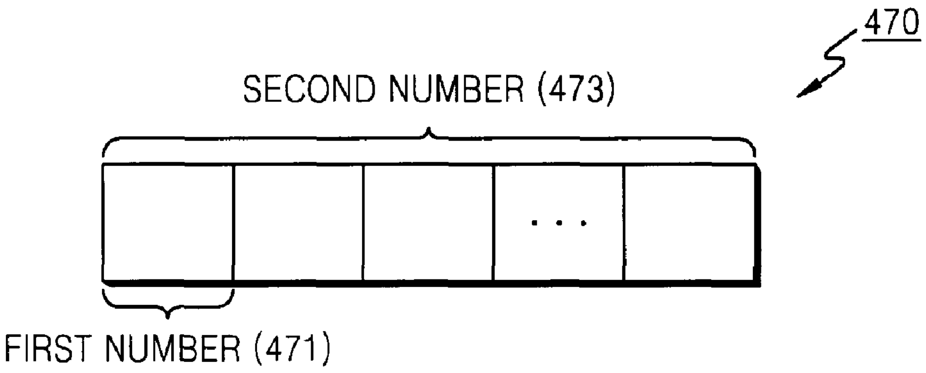
FIG. 4B is a schematic view illustrating random numbers which are tested.

FIG. 4B is a schematic view illustrating random numbers 470 which are tested according to embodiments of the invention.

Referring to FIGS. 4A and 4B, the random number generating unit 210 continuously outputs a second number of random numbers 473. The test unit 230 produces statistical data corresponding to the second number of random numbers 473 and performs a test.

A test can be performed on a first number of random numbers 471 to investigate whether the statistical characteristics of the first number of random numbers 471 satisfy security requirements. Accordingly, when the investigation on the first number of random numbers 471 is finished, the test is finished (operation s405). That is, the test may be performed on a reduced amount of data.

The test unit 230 can test the second number of random numbers 473 during one test suite. Accordingly, the test suite is finished (operation S419) by performing a test multiple times.

If it is not determined in operation S419 that the test suite is finished, the process goes to operation S421. In operation S421, the test unit 230 outputs a further generate signal S-gen to the random number generating unit 210 so that more bits are generated.

As described above, the apparatus 400 outputs the signals S_stop, CON_ref, and S_gen to the random number generating unit 210 according to the result of the test suite. Accordingly, the operation of the random number generating unit 210 can be controlled by the test unit 230.

If it is determined in operation S419 that the test suite is finished, the process goes to operation S435. In operation S435, the switching control unit 250 determines whether a new test suite is to be performed. The determination in operation S435 can be made in response to information on a system clock received in operation S431 and information on the number of test suites received in operation S433. In order to ensure the quality of random numbers, a predetermined number of tests can be performed at predetermined intervals. For example, the quality of periodically generated random numbers may be evaluated by automatically performing one test per minute. The term 'automatically performing' means that an online test can be continuously performed by itself without external commands.

Accordingly, the switching control unit 250 determines whether an additional test is to be performed by comparing the information on the system clock and the information on the number of test suites. For example, if 60 tests must be performed for 60 minutes but fewer than 60 tests have been performed for 60 minutes, an additional test is to be performed.

If it is determined in operation S435 that the test suite is to continue to be performed, the process goes to operation S451. In operation S451, the switching control unit 250 enters a test mode. Accordingly, the switching control unit 250 outputs a switching control signal CON_switch so that the switching unit 220 connects the first node N1 and the terminal S2.

If it is determined in operation S435 that the test suite is to be stopped, the process goes to operation S453. In operation S453, the switching control unit 250 enters an output mode. Accordingly, the switching control unit 250 outputs a switching control signal CON_switch so that the switching unit 220 connects the first node N1 and the terminal S1.

An apparatus 400 according to embodiments of the present invention can control the switching unit 220 using the switching control unit 430. Also, when the test suite is not finished or the test has not been passed, the switching unit 220 does not connect the first node N1 and the terminal S1. Accordingly, statistically weak data having low quality are not output, and only reliable random numbers may be output.

Accordingly, since apparatus and/or methods according to embodiments of the present invention may perform a test by receiving only statistical data from a random number generating unit, a separate memory for storing transmitted random numbers is not required, thereby simplifying the apparatus. Also, there is a reduced risk of secret information leakage due to random numbers being stored in a memory in the test unit. The switching unit can be automatically controlled by the test unit.

Because apparatus and/or methods according to embodiments of the invention can control whether random numbers are generated and output depending on the result of the test, finally output random numbers can be more effectively controlled. Furthermore, since whether the random numbers are finally output may be determined depending on whether the test suite is finished, external output of data outside a statistically tolerable range can be reduced or avoided, thereby helping improve the quality of the finally output random numbers.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An apparatus for testing a random number generator, comprising:

a random number generating unit configured to generate and output random numbers; and a switching unit configured to receive the random numbers from the random number generating unit and to selectively transmit the random numbers to a final output unit or a test unit in response to a switching control signal;

wherein the test unit is configured to perform a test on the random numbers to determine whether the transmitted random numbers are within a statistical range, configured to control the generation of random numbers according to a result of the test, and configured to output the switching control signal based on whether a test suite is finished;

wherein, if it is determined that an error has occurred in the random number generating unit, the test unit is configured to output a random number generation stop signal to the random number generating unit to stop the generation of random numbers.

2. The apparatus of claim 1, wherein the test unit is configured to extract statistical data from the random numbers, wherein the statistical data include information on whether the transmitted random numbers are within the statistical range.

3. The apparatus of claim 2, wherein, if it is determined that the random numbers are normal but the test is not finished, the test unit is configured to output a further signal to the random number generating unit commanding the random number generating unit to generate more random numbers.

4. The apparatus of claim 2, wherein, if it is determined that the random numbers are normal and the test is finished, the test unit is configured to determine whether the test suite has been performed a predetermined number of times.

5. The apparatus of claim 4, wherein, if it is determined that the test suite has been performed the predetermined number of times, the test unit is configured to generate a switching control signal to connect the random number generating unit to the final output unit, and if it is determined that the test suite has not been performed the predetermined number of times, the test unit is configured to generate a switching control signal to connect the random number generating unit to the test unit.

6. The apparatus of claim 4, wherein the test unit is configured to receive information on a system clock and information on a number of tests performed for a predetermined period of time, and to determine using the received information whether the test has been performed the predetermined number of times.

7. The apparatus of claim 1, wherein, if the result of the test shows that the transmitted random numbers are outside the statistical range, the test unit is configured to determine that a preliminary error has occurred.

8. The apparatus of claim 7, wherein, if the preliminary error occurs more than a predetermined number of times, the test unit is configured to determine that an error has occurred in the random number generating unit.

9. The apparatus of claim 7, wherein, if it is determined that a preliminary error has occurred, the test unit is configured to output a refresh signal to the random number generating unit to reset the random number generating unit.

10. The apparatus of claim 9, wherein, if the preliminary error has occurred fewer than a predetermined number of times, the test unit is configured to reset the test and to perform the test again.

11. The apparatus of claim 1, wherein the switching unit comprises a de-multiplexer that is configured to respond to the switching control signal, and that has an input end connected to an output end of the random number generating unit, a first output end connected to the final output unit, and a second output end connected to an input end of the test unit.

12. A method for testing a random number generator, the method comprising:

performing a test on generated random numbers to determine whether the random numbers are within a statistical range;

controlling the generation of random numbers in response to a result of the test and whether the test is finished;

upon completion of the test, determining if a test suite is finished; and if the test suite is finished, outputting the random numbers as final random numbers;

wherein controlling the generation of the random numbers comprises, if it is determined that an error has occurred in the generation of the random numbers, stopping the generation of random numbers.

13. The method of claim 12, wherein performing the test comprises extracting statistical data from the generated random numbers, and determining based on the statistical data whether the random numbers are within the statistical range.

14. The method of claim 12, wherein controlling the generation of the random numbers comprises:

if the result of the test shows that the generated random numbers are outside the statistical range, determining that a preliminary error has occurred; and resetting the generated random numbers.

15. The method of claim 14, wherein controlling the generation of the random numbers comprises:

determining if the preliminary error has occurred more than a predetermined number of times; and if it is determined that the preliminary error has occurred more than the predetermined number of times, determining that an error has occurred in the generation of the random numbers.

16. The method of claim 15, wherein controlling the generation of the random numbers comprises, if the preliminary error has occurred less than the predetermined number of times, generating additional random numbers and performing the test on the additional random numbers.

17. The method of claim 12, wherein determining whether the test suite is finished comprises, if it is determined that the random numbers are normal but the test suite is not finished, generating more random numbers.

18. The method of claim 17, wherein determining whether the test is finished comprises:

receiving information on a system clock and the number of the tests performed for a predetermined period of time; and determining based on the received information whether the test suite has been performed the predetermined number of times.

19. The method of claim 12, wherein determining whether the test suite is finished comprises, if it is determined that the random numbers are normal and the test is finished, determining whether the test suite has been performed a predetermined number of times;

if it is determined that the test suite has been performed the predetermined number of times, finishing the test suite; and if it is determined that the test suite has not been performed the predetermined number of times, returning to the performing of the test.

* * * * *